INVENTOR.(S)
BILLY D. BABB

April 21, 1970 JAMES E. WEBB 3,507,425
ADMINISTRATOR OF THE NATIONAL AERONAUTICS
AND SPACE ADMINISTRATION
METHOD AND APPARATUS FOR CRYOGENIC WIRE STRIPPING
Filed March 26, 1968 2 Sheets-Sheet 2

INVENTOR.(S)
BILLY D. BABB

BY
ATTORNEYS

United States Patent Office 3,507,425
Patented Apr. 21, 1970

3,507,425
METHOD AND APPARATUS FOR CRYOGENIC WIRE STRIPPING
James E. Webb, Administrator of the National Aeronautics and Space Administration, with respect to an invention of Billy D. Babb, Madison, Ala.
Filed Mar. 28, 1968, Ser. No. 716,734
Int. Cl. B23p *19/02;* B26f *3/00;* H02g *1/12*
U.S. Cl. 225—1  7 Claims

ABSTRACT OF THE DISCLOSURE

A method and apparatus for removing the plastic insulation from wire by dipping the wire into a cryogenic liquid so as to freeze the insulation and cause it to crystallize, breaking the frozen insulation by impacting it with cutters, and then stripping off the fractured insulation. The apparatus includes a programmer and a fully automatic device for lifting the wire out of the cryogenic liquid and impacting the wire between fixed and movable cutters, thus preparing the wire for stripping by hand or with a hand tool.

BACKGROUND OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

FIELD OF THE INVENTION

This invention relates to a method and apparatus for wire stripping and more particularly to a method and apparatus for cryogenic stripping of plastic insulation from wire.

DESCRIPTION OF THE PRIOR ART

The stripping of insulation from the ends of electrically conductive wire for purposes of making necessary electro-mechanical connections is generally achieved by mechanical means which cut through the insulation of the wire before removing the same. Such devices frequently result in damage to the wire in the form of a nick or cut in the wire itself. In many applications, particularly those in which the apparatus incorporating the wires is subject to severe environmental accelerations, failure is often caused by electrical wires which have been weakened or damaged during the insulation stripping process. In fact, it is quite possible that a complex apparatus such as, for example, a multi-million dollar missile may be lost because of the failure of a single electrical wire connection.

Such a failure may be traced to damage to the wire caused during the stripping of insulation. The problem of high quality wire stripping is a challenging one and much effort has been expended in its solution.

One solution to the need for high quality wire stripping has been the development of thermal strippers. However, such strippers are complex devices containing heating elements to melt the insulation of the wire. In addition, such devices usually incorporate clamps which may possibly damage the wire through physical contact with it. Thermal stripping leaves a residue film on the wire, thus creating a requirement for an additional step of cleaning the wire before a good electrical connection can be made. Moreover, thermal stripping of some types of plastic insulation may generate noxious fumes.

SUMMARY OF THE INVENTION

Accordingly, it is an object of this invention to provide an improved method and apparatus for stripping wire which neither contaminates, mars, nor damages the wire during the insulation stripping process.

Still another object of this invention is to provide a method and apparatus for wire stripping which eliminates the need for either thermal treatment of the insulation or heating elements incorporated into the apparatus.

Yet another object of the invention is to provide a method and apparatus for wire stripping which eliminates the need for clamping of the wire or the use of clamps which physically grip the wire in any way.

These and other objects are accomplished in the present invention which includes a method of cryogenic wire stripping. A wire is inserted into the cryogenic liquid so as to freeze the insulation and cause it to crystallize. The insulation is then impacted with at least one cutter at the point where stripping is to be started, in order to cut the insulation part way through and fracture the remaining thickness of the insulation. Finally, the insulation is removed between the impacted point and the end. The device for fracturing the insulation of a wire to be stripped comprises a container for a cryogenic liquid, a cryogenic liquid in the container for freezing the insulation of a wire to be stripped, and means for impacting the frozen insulation of a wire to be stripped.

BRIEF DESCRIPTION OF THE DRAWINGS

The invention will be more fully understood when taken together with the accompanying drawings in which.

DESCRIPTION OF THE PREFERRED EMBODIMENT

Figure 1:
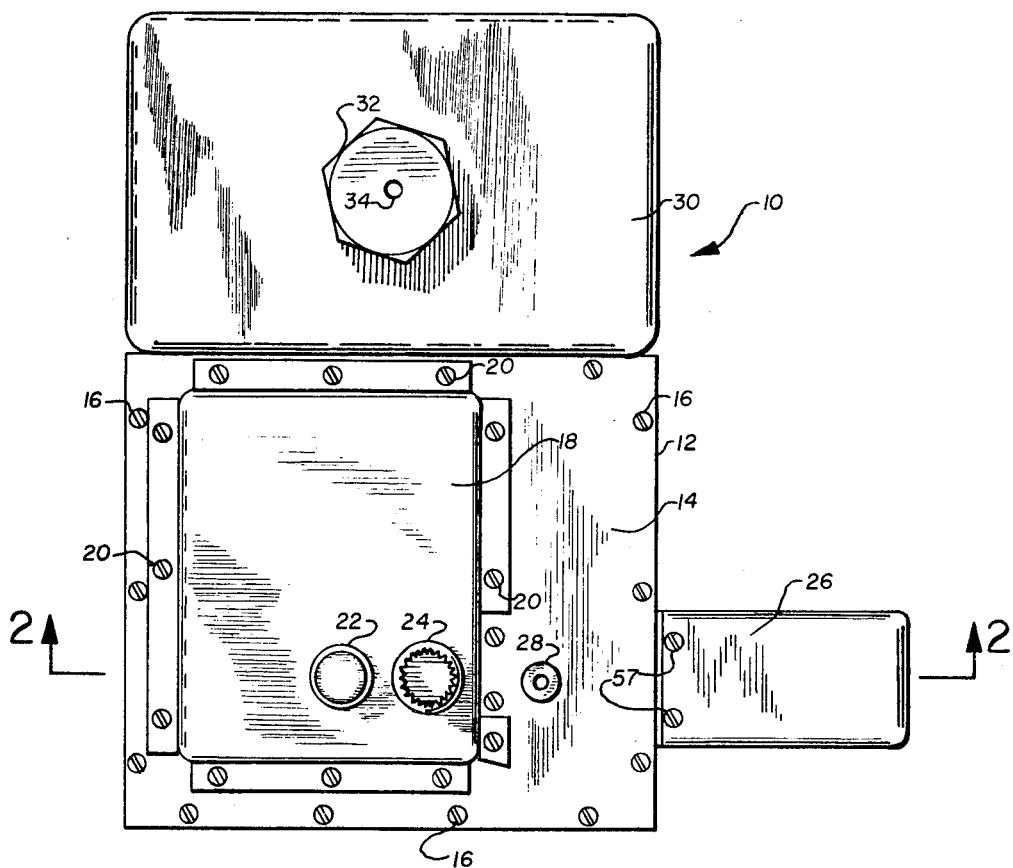
FIGURE 1 is a plan view of an enclosed cryogenic wire stripping device, made in accordance with this invention.

With continued reference to the accompanying figures, and with initial attention directed to FIGURE 1, there is illustrated in plan view a typical embodiment of the present invention, designated generally by the numeral 10. A base housing 12, shown in the lower portion of FIGURE 1, is the primary housing for the device. Top 14 is securely fastened to base housing 12 by screws 16. Mounted on top of base housing top 14 is a control housing 18, which contains control circuitry for the device, as will be explained more fully hereinafter. Housing 18 is fastened to top 14 by screws 20, which are of the same type as screws 16. At the top of housing 18 is shown a start-switch button 22 and the head 24 of a lift solenoid stop bolt, both of which will be described later. An impact solenoid housing 26 is attached to the side of base housing 12. Wire input guide 28 may be seen mounted in the base housing top 14.

Mounted adjacent to base housing 12 is a cryogenic liquid reservoir 30, which is connected to base housing 12, as will be described later. In the top of reservoir 30 is a fill hole and screw-in fill cap 32 with a vent hole 34.

Figure 2:
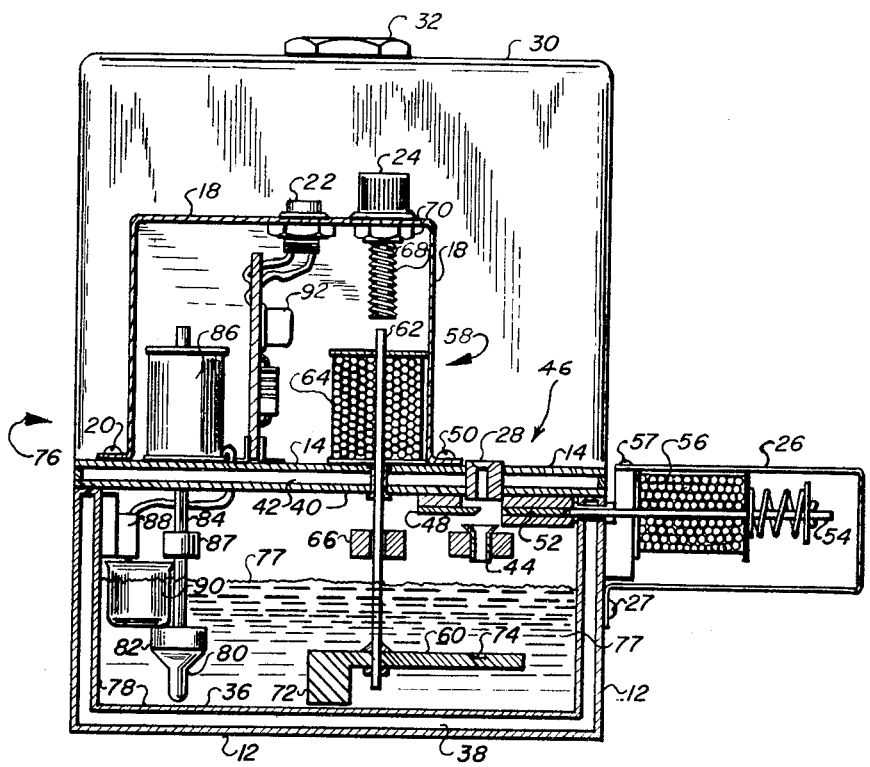
FIGURE 2 is a vertical sectional view of the cryogenic wire stripping device of FIGURE 1, taken along line 2—2 of FIGURE 1.

FIGURE 2, which is a vertical sectional view taken through base housing 12, control housing 18, and impact solenoid housing 26, shows the detailed construction of the invention. At the rear of the device, as viewed in FIGURE 2, may be seen the upper portion of cryogenic liquid reservoir 30 and its fill cap 32. As can be seen clearly in FIGURE 2, base housing 12 has an inner wall 36 which helps enclose an evacuated area 38. Top 14 of base plate housing 12 has an inner wall 40 which helps enclose evacuated area 42. Wire guide 44 may be seen mounted directly below wire input guide 28. On the right side of base housing 12, as viewed in FIGURE 2, may be seen screws 27 which fasten impact solenoid housing 26 to the base 12.

A cutting assembly, indicated generally by numeral 46, is shown on the right side of FIGURE 2. Stationary cutter 48 is securely mounted on the underside of top 14, adjacent to wire input guide 28, by a pair of screws 50. Moveable cutter 52 is fastened to the armature 54 of impact solenoid 56. Solenoid 56 is mounted in impact solenoid housing 26 by screws 57. Stationary cutter 48 and moveable cutter 52 are positioned opposite each other with the cutting edge of their blades in the horizontal plane, as viewed in FIGURE 2.

A wire lift assembly, indicated generally by numeral 58, is shown in the center portion of FIGURE 2. Wire stop platform 60 is attached to armature 62 of wire lift solenoid 64. Armature 62 travels through guide bearing 66. Upward travel of armature 62 is adjusted by limit stop bolt 68, which is threaded into nut 70. Nut 70 is welded to the underside of control housing 18. Downward travel of platform 60 is limited by stop portion 72. A small concave portion 74 is provided in platform 60 for receiving the end of a wire to be stripped.

A cryogenic liquid fill mechanism, indicated generally by numeral 76, is shown at the left side of FIGURE 2. Fill mechanism 76 maintains the proper level of cryogenic liquid 77 in the container 78 formed by the inner wall 36 of the base housing 12. A connecting pipe (not shown) connects cryogenic liquid reservoir 30 with container 78 and terminates at cryogenic liquid inlet 80. Stop valve 82 mounted on armature 84 of fill solenoid 86 controls the flow of cryogenic liquid from inlet 80. Armature 84 travels through guide bearing 87. Fill solenoid 86 is controlled by microswitch 88 and liquid level float 90 in a manner well known to those who are skilled in the art.

The control circuit for the device includes start-switch button 22 and programmer-sequence timer 92, which is known in the art, and is not per se considered patentably distinct.

One cycle of operation of the device is as follows: The end of a wire to be stripped of insulation is inserted into wire input guide 28 and pushed down through wire guide 44 until the end of the wire protrudes into cryogenic liquid 77 and contacts concave portion 74 of wire stop platform 60. After a time delay of the order of fifteen seconds pre-set into programmer 92, which allows the end of the wire to freeze and the insulation of the wire to crystallize, the programmer 92 actuates lift solenoid 64. This raises platform 60, thus lifting the frozen portion of the wire to be stripped to a position opposite the cutters 48 and 52. Programmer 92 then actuates impact solenoid 56, causing the wire to be impacted by moveable cutter 52 and stationary cutter 48. This cuts the surface of the frozen insulation on two sides to a depth of about one-third of the thickness of the insulation and causes the remaining portion of the insulation to fracture. The wire is then removed from the device and the insulation between the point of fracture and the end of the wire is easily removed by hand or with a hand tool.

From the foregoing it may be seen that applicant has invented both a novel method of stripping insulation from the end of a wire and a novel apparatus for carrying out the method. By first freezing the insulation on the end of a wire to be stripped, by dipping it into a cryogenic liquid for a few seconds and then impacting the frozen insulation with one or more cutters, the insulation may be fractured around the entire circumference of the wire without ever touching the wire itself. Moreover, no thermal processing or heating elements need be used and the wire need not be gripped by clamps. The apparatus disclosed herein automatically prepares a wire for stripping, once the wire has been inserted into the device and the start-button actuated. The device then functions automatically to lift the wire out of the cryogenic liquid and impact the frozen insulation so as to fracture it and thus prepare it for hand stripping.

Obviously, numerous modifications and variations of the present invention are possible in the light of the above teachings. It is therefore to be understood that, within the scope of the attendant claims, the invention may be practiced otherwise than is specifically prescribed.

What is claimed is:

1. A method of stripping insulation from the end of wire comprising the steps of:
   (a) inserting the end of the wire into a cryogenc liquid, so as to freeze the insulation and cause it to crystallize;
   (b) impacting the insulation with at least one cutter at the point where stripping is to be started, in order to cut the insulation part way through and fracture the remaining thickness of the insulation;
   (c) removing the insulation between the impacted point and the end.

2. The method of stripping insulation from the end of a wire of claim 1 wherein the insulation between the impacted point and the end of the wire is removed by hand.

3. The method of stripping insulation from the end of a wire of claim 1 wherein the insulation between the impacted point and the end of the wire is removed by hand through the use of a hand tool.

4. An apparatus for fracturing the insulation of a wire to be stripped, comprising:
   (a) a container for a cryogenic liquid;
   (b) a cryogenic liquid in said container, for freezing the insulation of a wire to be stripped;
   (c) means for impacting the frozen insulation of a wire to be stripped, said impacting means comprising:
      (1) a movable cutter, arranged and positioned so as to move in a direction normal to the axis of the wire to be stripped;
      (2) a stationary cutter mounted opposite said moveable cutter, and
      (3) an impact solenoid connected to said moveable cutter.

5. The apparatus for fracturing the insulation of a wire to be stripped of claim 4 including a wire lifting mechanism, said mechanism comprising:
   (a) a wire lift solenoid mounted above said container, said solenoid including an elongated armature which extends down into said container;
   (b) a wire stop platform attached to said armature and extending under said cutting mechanism, for stopping the downward travel of a wire in said cryogenic liquid and then lifting the frozen portion of the wire into position between said cutters, said platform having a lower limit stop portion extending downward to touch the bottom of said container; and
   (c) an adjustable stop for said armature mounted above said solenoid.

6. The apparatus for fracturing the insulation of a wire to be stripped of claim 5 including a cryogenic liquid fill mechanism, comprising:
   (a) a cryogenic liquid reservoir mounted beside and connected to said container;
   (b) a cryogenic liquid level float;
   (c) a microswitch connected to said float;
   (d) a fill solenoid connected to said microswitch, said solenoid including an elongated armature which extends down into said container; and (c) a stop valve connected to said fill solenoid armature, for controlling the flow of cryogenic liquid from said reservoir to said container.

7. The apparatus for fracturing the insulation of a wire to be stripped of claim 6 including a control circuit comprising:

(a) a programmer connected to said wire lift solenoid and said impact solenoid, for controlling the operation of said solenoids in sequence; and (b) means for starting said programmer.

References Cited

UNITED STATES PATENTS

| 2,879,005 | 3/1959 | Jarvis | 241—65 X |
| 2,956,717 | 10/1960 | Scharf | 81—9.51 X |
| 2,919,862 | 1/1960 | Beike et al. | 241—65 X |
| 3,101,757 | 8/1963 | Hanson | 81—9.51 X |

JAMES M. MEISTER, Primary Examiner

U.S. Cl. X.R.

29—427; 81—9.51; 225—103